9389X
E. Marsh,
Derrick.
Patented Feb. 12, 1836.
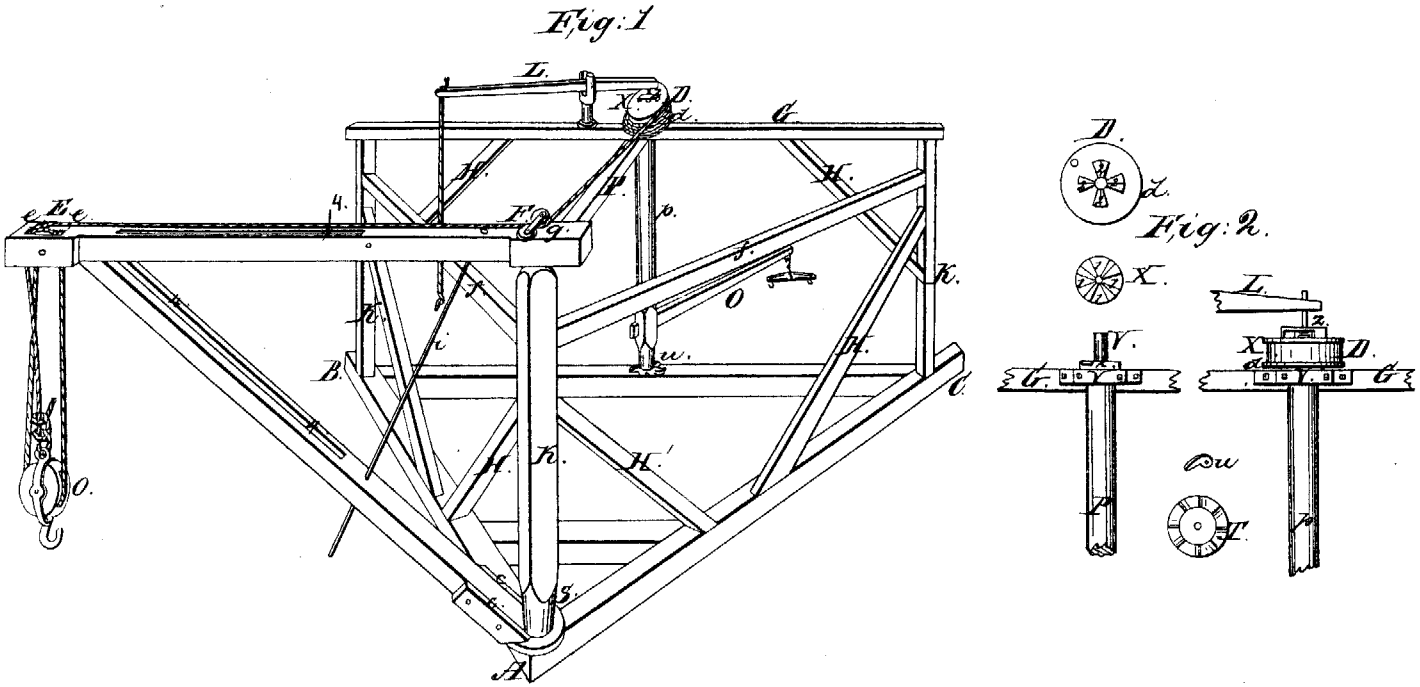
AM. PHOTO-LITHO. CO. N.Y. (OSBORNE'S PROCESS)

Feb. 12. 1836 9389X

Elias Marsh. Oswego New York.

Letters Patent.

The schedule referred to in these Letters Patent and making part of the same, containing a description in the words of the said Elias Marsh, himself of his improvement in the crane for elevating and removing heavy bodies.

To all to whom these presents shall come; Be it known that I Elias Marsh of the town of Oswego in the County of Oswego and State of New York. have invented a new and useful improvement in the crane for removing & elevating heavy bodies, and for other purposes, and that the following is a full and exact description of the construction and operation of the said crane as invented or improved by me. The principal parts of the Machine are the frame, the Boom and arm, the drum, the shaft and the crane. First the frame (see fig 1 a perspective drawing of the machine) is constructed of three substantial sill pieces, tenoned together in form of a triangle A. B. C. which I prefer making rectangular at A. the angle at which the arm is to be placed. from each angle rises a strong upright timber K. tenoned into the sill pieces and receiving at their upper ends the side rails F.E. and cap piece G. Braces H.H. are also added for the purpose of stiffening the frame, and a strong brace or cross piece P extends from the top of the upright at the right angle A (which for distinction I shall call the king post) to the middle of the cap piece G. 2nd -

The arm and Boom the first E. F. is made of a square piece of timber; of dimensions proportioned to the work for which the crane is to be employed, with one or more pulleys c.c. at the outer extremity E. to receive the hoisting rope which passes to the block O and a double leading pulley S at the inner extremity

[illegible]

9389X

J by which the hoisting rope (r) from the drum is always
kept on the arm and the force thus made to act in the
direction of its length and of the brace P. a hole is also
bored on the underside of the end J which receives a
strong iron gudgeon made fast in the top of the king post
upon which the arm traverses as a centre of motion; the
Boom B. descends obliquely to the foot of the king post
against which it bears, being kept in place simply by
a semicircular notch either cut out of the solid or formed
by wooden Jaws bolted on the sides of the Boom, the
foot of the post being also rounded so as to allow the
boom to traverse freely and without much friction also
for the same purpose a projecting collar S of iron or hard
wood is placed at the foot of the post which receives
the downward bearing of the boom. For strengthening the
boom as well as for convenience in handling the crane
when unshipped it is connected near the middle S[illegible] with
the inner end of the arm by a strong bar t, of iron or wire
3rd. The Drum D is made of a solid cylinder of hard wood
of suitable dimentions, it is pierced through the centre
its whole length to receive the iron gudgeon o of the
shaft p, on the lower end is bolted a disk of iron inden
-ted as hereinafter mentioned (d see fig 3) having a hole h
for the passage of the gudgeon, it also projects a short distance
beyond the cylinder forming a flange to keep up the rope.
The top is covered with a circular iron plate X, having at
the centre a staple Z. and swivel pin which latter is fasten
-ed to a small lever L secured to the top of the frame above
the drum by which the latter can be raised or lowered and
the coupling with the shaft be thrown out, or into gear at
pleasure. Fourth the shaft p is of wood having a strong
iron gudgeon o in the upper end, which ~~which~~ passes into
the drum the whole length of the latter and forms a shaft or spindle upon which the drum turns loosely, upon
the top of the shaft is secured a disk or coupling which
so the teeth or knobs of which 1.1.1. match the sinks 2.2.2 of
of the disk on the drum, the upper end of the shaft is
confined against the cap piece G by a suitable box
and screw bolts V and the lower end has a short gudgeon
which is stepped into the centre of a solid horizontal
ratch wheel T secured to the middle of that sill under
the cap piece G, a pale U, is attached to the foot of the
shaft which takes in the ratch T and prevents the shaft from
running back. A strong lever Q is mortised into the shaft to
which the moving power is applied. Operation The machine being placed
in a suitable position the body to be raised is attached to the
hook of the block O, and the shaft p, put in revolution either by
horse, hand or other power when the weight is raised to the
desired heighth The arm is turned to the required position and the
drum being raised by the lever L, the body is suddenly deposited with-
out the delay & trouble of retrograding the shaft and moreover during
the whole operation the force being made by the peculiar construc-
tion of the machine, to act very nearly in the direction of the
length of the arm and of the brace P. it will operate equally well
in any position of the arm. When the Machine is to be used in
taking up old canal locks or similar work, the arm and boom
are each to have a groove &c for the passage of the rope, and a
pulley or pulleys moveable along the top of the arm are to be used
in lieu of the fixed pulleys c, c, -

Now what I claim as new and as my
invention is the coupling of the drum and the peculiar
arrangement by which the arm is left free to traverse while
the force is operating, or by which the force applied is made
to act & react in the direction of the arm and connecting
brace, p, in any position of the arm, without the inter-
vention of check ropes, windlasses &c. attached to the

216.

T389X brom as in ordinary use. In Testimony that the foregoing is a true specification of my said improvement I have hereunto set my hand this 3rd day of Jany 1836

Witnesses

Clement T. Coote
George H. Coote

Elias Marsh

Drawing

Exd.
HGC 1200 wd